United States Patent

[11] 3,584,248

[72] Inventors Toshimitsu Higashino
Inazawa-shi;
Sinichi Inagaki, Anjo-shi, both of, Japan
[21] Appl. No 856,340
[22] Filed Sept. 9, 1969
[45] Patented June 8, 1971
[73] Assignee Nippon Denso Kabushiki Kaisha
Kariya-shi, Japan
[32] Priority Nov. 28, 1968
[33] Japan
[31] 43/87138

[54] AC POWERED DC MOTOR INCLUDING SEMICONDUCTOR RECTIFIERS
7 Claims, 8 Drawing Figs.

[52] U.S. Cl..................................................... 310/68,
310/64, 310/239

[51] Int. Cl............................................................. H02k 11/00
[50] Field of Search............................................. 310/64, 65,
67, 68, 68.4, 168, 239

[56] References Cited
UNITED STATES PATENTS

| | | | |
|---|---|---|---|
| 3,226,581 | 12/1965 | Brewster et al. ............. | 310/65X |
| 3,422,339 | 1/1969 | Baker......................... | 310/68X |
| 3,496,394 | 2/1970 | Balcke et al. ................ | 310/68 |

*Primary Examiner*—D. F. Duggan
*Attorney*—Cushman, Darby and Cushman

ABSTRACT: In a DC motor which includes semiconductor rectifiers within it for converting AC power into DC power for driving the motor, an improved arrangement for supporting the rectifiers and brush holders.

PATENTED JUN 8 1971  3,584,248

INVENTORS
Toshimitsu Higashino
Sinichi Inagaki
BY Cushman, Darby & Cushman
ATTORNEYS INVENTORS
Toshimitsu Higashino
Sinichi Inagaki
BY Cushman, Darby & Cushman
ATTORNEYS

AC POWERED DC MOTOR INCLUDING SEMICONDUCTOR RECTIFIERS

BACKGROUND OF THE INVENTION

1. Field of the Invention

The present invention relates to a DC motor powered from an AC source through semiconductor rectifiers and more particularly to an arrangement for supporting the brush holders and semiconductor rectifiers in a DC motor incorporating such semiconductor rectifiers.

2. Description of the Prior Art

Increasing demand for the miniaturization of electric motors in recent times has resulted in more and more instances wherein when a large starting torque or speed control is required in an AC powered system, an alternating current is rectified by means of semiconductor rectifiers to drive a DC motor in place of an AC commutator motor.

However, these instances have given rise to various problems wherein if semiconductor rectifiers were installed separately from the motor, it would require an extra space for the rectifiers in addition to the motor, while on the other hand any forced air cooling means would be necessitated or semiconductor rectifiers of a relatively large dimension would be required in consideration of the heat radiation when no forced air cooling means are provided. Such being the case, an attempt has hitherto been made wherein in order to attain a reduction in cost, semiconductor rectifiers were directly built in the motor to avoid the trouble of having some external connections and at the same time to reduce the space required for the semiconductor rectifiers through ventilation cooling means provided by a cooling fan for the motor. With prior art motors of this kind having built-in semiconductor rectifiers, semiconductor rectifiers were connected in a bridge circuit to form a full-wave rectifier circuit which was in turn encapsulated entirely and built in the motor, or semiconductor rectifiers which were secured to heat radiator plates or cooling fins were supported on end brackets within the motor with the rectifiers being electrically insulated from the end brackets. Thus, in the former there was the drawback of ineffective heat radiation and this radiation of heat was still insufficient even in the latter case. Moreover, since electrical connections were necessary between the rectifiers and the brushes and the field windings, much labor was required in connecting or disconnecting the wiring when the motor was assembled or disassembled.

SUMMARY OF THE INVENTION

In order to overcome the aforesaid drawbacks, the present invention has for its object the provision of an AC powered DC motor incorporating semiconductor rectifiers wherein the semiconductor rectifiers are securedly fixed to heat radiator plates in a manner such that the heat radiator plates come on the output side and brush holders are mounted to complete a disc structure which is in turn insulated from a yoke and end brackets, being detachably secured to said yoke, whereby the procedures for wiring connections as well as assembly and disassembling are both simple and easy.

BRIEF DESCRIPTION OF THE DRAWING

In the drawing, the same reference numerals designate identical or equivalent component parts.

DESCRIPTION OF THE PREFERRED EMBODIMENT

Figure 1:
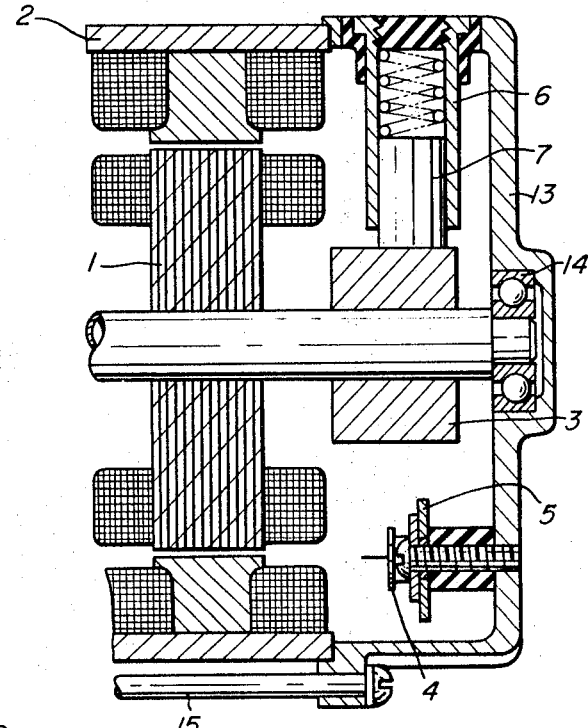
FIG. 1 is a fractional sectional view of a known prior art AC powered DC motor having built-in semiconductor rectifiers.

As shown in FIG. 1 by way of an example, a prior art motor of this kind was such that semiconductor rectifiers 4 were mounted to heat radiator plates 5 and then said heat radiator plates 5 and brush holders 6 carrying brushes 7 were secured to but electrically insulated from the motor end brackets 13, whereupon at the time the end brackets 13 were assembled the necessary wiring between the rectifiers 4, between the rectifiers 4 and the brush holders 6 and among these component parts and the field section 2 were effected.

Figure 2:
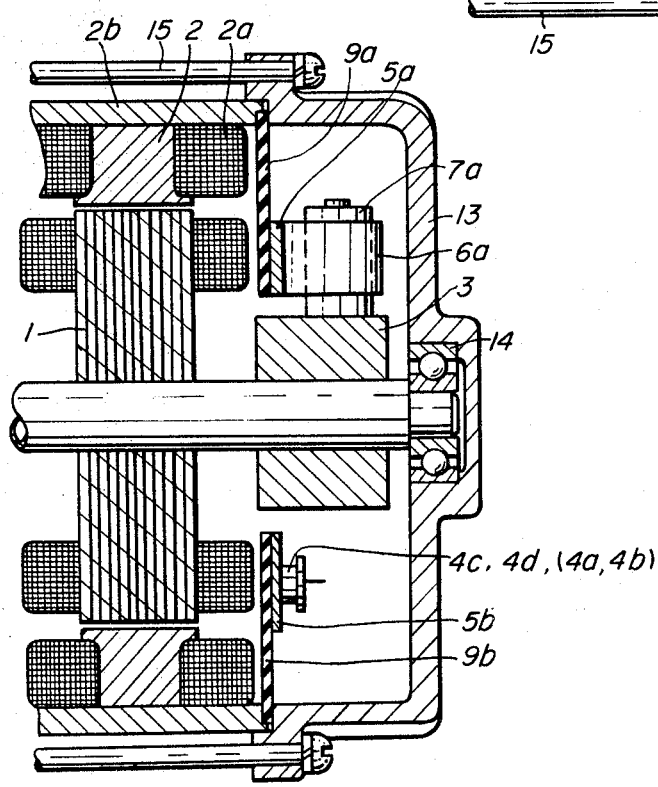
FIG. 2 is a sectional view showing a principal part of the DC motor according to the present invention.
Figure 3:
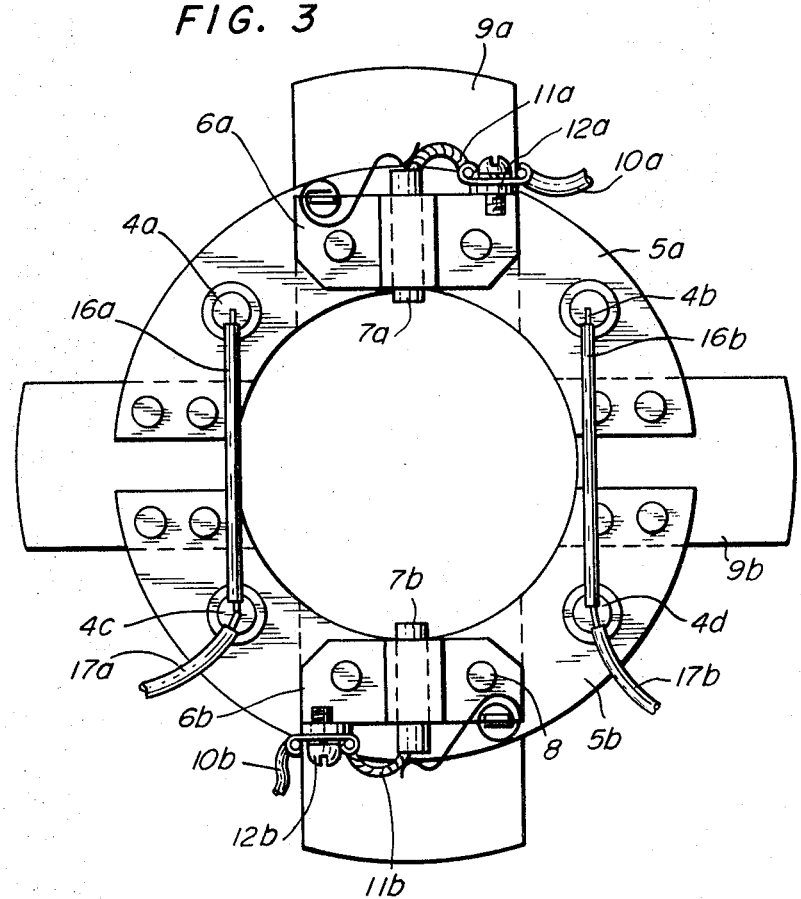
FIG. 3 is a front view of the disc structure in the motor of the present invention comprising semiconductor rectifiers, heat radiator plates and brush holders.
Figure 4:
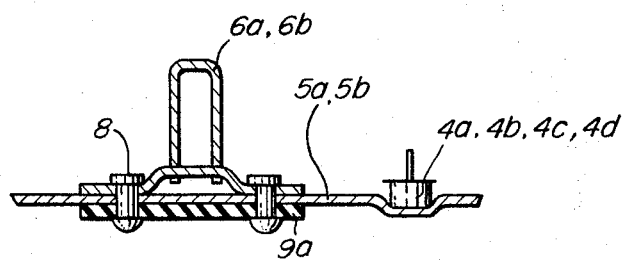
FIGS. 4 and 5 are sectional views each showing an example of an integrally combined structure of the heat radiator plates and the brush holders in the motor of the present invention.

In FIGS. 2 and 3 and in FIG. 4 all showing an embodiment of the present invention, numeral 1 designates an armature of the DC motor; 2 a field section; 2a a field winding; 2b a yoke, the armature 1 having a commutator 3 on the same shaft. Numerals 4a, 4b, 4c and 4d each designates a semiconductor rectifier; 5a and 5b, heat radiator plates. As shown in the wiring diagram of FIG. 6, the semiconductor rectifiers are secured in pairs to the heat radiator plates 5a and 5b, respectively, so that the output is provided on the side of the heat radiator plates. Numerals 6a and 6b designate brush holders supporting brushes 7a and 7b adapted to slide over the commutator 3 and the brush holders 6a and 6b are integrally and conductively secured with an insulating plate 9a to the heat radiator plates 5a and 5b at the same potentials by means of screws or rivets 8. Numeral 9b also designates an insulating plate adapted to connect the two heat radiator plates 5a and 5b in electrical isolation. As will be explained in the description to follow, the insulating plates 9a and 9b serve to securedly hold the disc structure comprising the semiconductor rectifiers 4a, 4b, 4c and 4d, heat radiator plates 5a and 5b and the brush holders 6a and 6b together with the field section 2. Connection between the field section 2 and the disc structure is effected by clamping lead wires 10a and 10b from the field winding 2a and lead wires 11a and 11b from the brushes 7a and 7b to terminals 12a and 12b of the brush holders 6a and 6b, respectively.

Numeral 13 designates a motor end bracket which carries the armature 1 through bearings 14 and clamps the yoke 2b with another end bracket which is not shown, the end bracket 13 being clamped and secured by means of a bolt 15. Whereupon the insulating plates 9a and 9b are inserted between the yoke 2b and the motor end bracket 13 as shown in FIG. 2 so that the disc structure is mounted in a suspended manner through the insulating plates 9a and 9b. Of course, the dimensions of the yoke 2b and the armature 1 having the commutator 3 on the same shaft or the like are predetermined so that the brushes 7a and 7b are placed in proper position above the commutator 3 when the bolts 15 are fastened.

Figure 6:
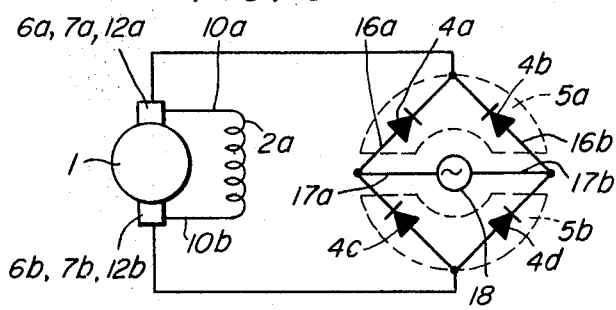
FIG. 6 is a wiring diagram of a shunt wound motor according to the present invention.

Furthermore, numerals 16a and 16b designate lead wires providing connection between the semiconductor rectifiers 4a, 4b and 4c, 4d, and as shown in FIG. 6 numerals 17a and 17b designate lead wires for connecting said semiconductor rectifiers 4a, 4c and 4b, 4d to an AC source 18.

With the arrangement described above, by integrally mounting the brush holders 6a and 6b to the heat radiator plates 5a and 5b to which are secured the semiconductor rectifiers 4a, 4b and 4c, 4d, respectively, and which are at the same potentials as the brush holders 6a and 6b, the lead wires shown in FIG. 6 as connected between the brush holders 6a, 6b and the heat radiator plates 5a, 5b may be eliminated thus simplifying the connection. Of course, if portions of the heat radiator plates 5a and 5b are depressed following the shape of the brush holders to integrally combine the heat radiator plates 5a and 5b and the brush holders 6a and 6b, the construction of the disc structure may be simplified still further.

In addition, the wiring or connecting procedures are simple and easy because the lead wires 16a, 16b connecting the semiconductor rectifiers 4a, 4b and 4c, 4d and the lead wires 17a, 17b providing a connection between the AC source 18 and said rectifiers may be previously connected after the disc structure has been assembled, and thus what is required at the time of assemblage to the motor is only to connect the lead wires 10a, 10b from the field windings 2a to the terminals 12a, 12b of the brush holders 6a, 6b.

Still further, the motor end bracket 13 is freely detachable and its maintenance is simple since the arrangement of the present invention does not require that the disc structure and the motor end bracket 13 must be positively secured to each other. Although the arrangement of the present embodiment is such that the insulating plates 9a and 9b incorporated in the disc structure are secured between the yoke 2b and the motor end bracket 13 so as to provide the maximum insulating distances between the heat radiator plates 5a, 5b and the yoke 2b and the motor end bracket 13, it will be sufficient in effect if only the disc structure is maintained electrically insulated with respect to both the yoke 2b and the motor end bracket 13 and detachably secured to the yoke 2b. Thus, for example, a recessed portion may be provided in the interior of the yoke so that the disc structure may be secured into said recessed portion by some screws passing through the insulating material.

Figure 5:
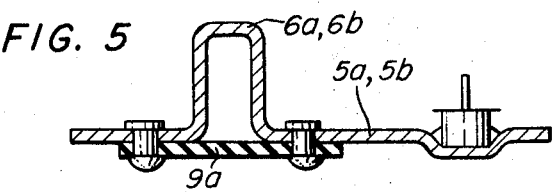
Figure 7:
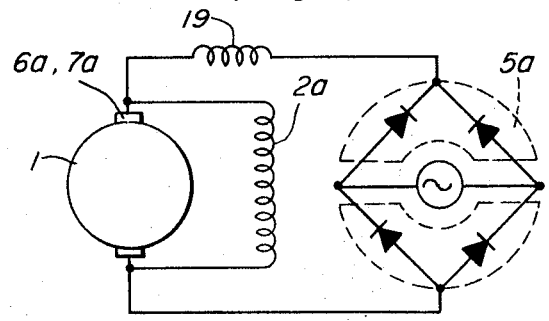
FIG. 7 is a wiring diagram of a compound wound motor according to the present invention.
Figure 8:
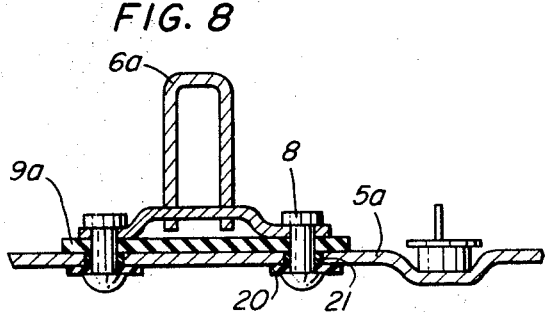
FIG. 8 is a sectional view showing the construction of the brush holder on the series winding side applied to the compound wound motor of FIG. 7.

Although this has been explained with respect to a shunt wound motor, it should be noted that with a series wound motor or a compound wound motor connected as shown in FIG. 7, the brush holder 6a on the side of the series wound field winding 19 and the heat radiator plate 5a will not be at the same potential with each other and thus said brush holder 6a and heat radiator plate 5a may not be integrally formed as shown in FIGS. 4 and 5. However, as shown in FIG. 8, insulating material 20 and 21 which is interposed between the brush holder 6a and the heat radiator plate 5a as well as between these and the rivets 8 will be easily adaptable to the arrangement of the present invention. At the same time, this insulating structure may be very light in weight compared with other portions, since the voltage applicable between the brush holder 6a and the heat radiator plate 5a will be only a voltage drop caused by the series wound field winding 19.

It will be evident from the foregoing that the present invention is effective in eliminating those lead wires that electrically connect the brush holders and the heat radiator plates with each other and thereby provide for simple wiring because the semiconductor rectifiers are secured to the heat radiator plates such that the latter come to be on the output side and the brush holders are installed to complete the disc structure. The present invention is also effective in that since the wiring or connection among the component parts of the disc structure such as the semiconductor rectifiers and the brush holders may be made prior to the assembly of the disc structure, the wiring procedures at the time of assemblage to the motor may be considerably simplified. Furthermore, as the disc structure is electrically insulated from the yoke and the motor end brackets and is detachably secured to said yoke, the motor may be easily disassembled into the field section, disc structure and the motor end brackets so that repair work and the like may be easily conducted. This is the remarkable effect attributable to the present invention.

We claim:

1. An improvement for an AC powered DC motor including a yoke having pole pieces and field windings, an armature disposed within said yoke and having a commutator, end covers positioned on both sides of said yoke and supporting said armature through bearings, brush holders for holding brushes for sliding on said commutator, and semiconductor rectifiers for rectifying an AC input and feeding a DC output current to said brushes and field windings, said improvement comprising:

a disc-shaped member for mounting both said brush holders and said rectifiers, said disc-shaped member including at least two heat radiator plates connected together by at least two insulating plates, portions of said insulating plates extending beyond said radiator plates for mounting said disc-shaped member to said motor, said rectifiers secured to said heat radiator plates such that the heat radiator plates are electrically connected to the DC output side of a rectifying circuit of said rectifiers, and said brush holders secured to said heat radiator plates.

2. An improvement as in claim 1 wherein:

at least two rectifiers are secured to each of at least two of said heat radiator plates thereby forming part of a full wave bridge rectifying circuit with the DC output terminals thereof comprising said heat radiator plates.

3. An improvement as in claim 2 wherein said brush holders are both electrically and mechanically secured to said heat radiator plates.

4. An improvement as in claim 3 wherein said brush holders are integrally formed with said heat radiator plates.

5. An improvement as in claim 1 wherein said brush holders and said insulating plates are secured to said heat radiator plates by common conductive connecting members.

6. An improvement as in claim 1 wherein said brush holders are provided with connecting terminals and said field windings and said brushes are electrically connected by lead wire screw connected onto said connecting terminals.

7. An improvement as in claim 1 wherein said disc-shaped member is mounted to said motor by an outwardly extending portion of said insulating plates being interposed between said yoke and one of said end covers of said motor.